Figure 1:
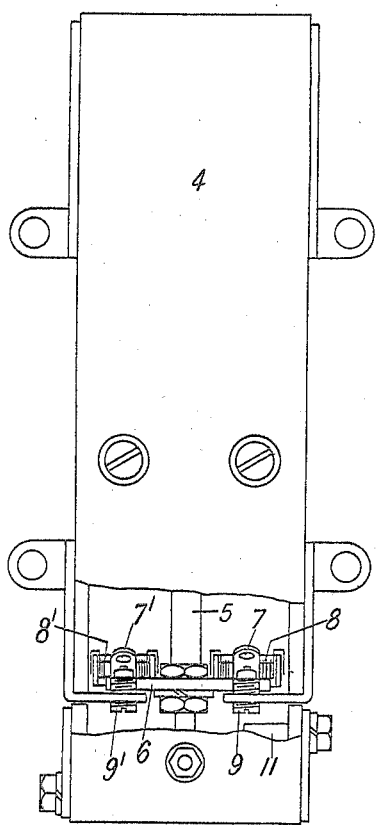

Aug. 27, 1935.  L. SATCHWELL  2,012,322

AUTOMATIC CONTROL OF COMBUSTION FURNACES

Filed July 26, 1932

Inventor
Leonard Satchwell
By Pennie Davis Marvin & Edmonds
Attorneys

Patented Aug. 27, 1935

2,012,322

UNITED STATES PATENT OFFICE 2,012,322

AUTOMATIC CONTROL OF COMBUSTION FURNACES

Leonard Satchwell, Slough, England

Application July 26, 1932, Serial No. 624,700
In Great Britain February 25, 1932

2 Claims. (Cl. 158—28)

This invention relates to systems of control for combustion furnaces, using liquid or pulverized fuel, and has for its purpose the provision of simple and compact means for operating and controlling the burning apparatus, both as regards the supply of fuel, its ignition, and its safety in case of non-ignition or flame failure.

The elements commonly required for the automatic control of such furnaces consist of a device to turn on the supply of the fuel and turn on the ignition means, a thermostat in the liquid or other medium to be heated, and/or a thermostat in the space to be heated and a safety or flame thermostat responsive to the flame in the furnace which flame or safety thermostat operates to interrupt the supply of the fuel in the event of failure of the flame.

In burners such as those used for oil it is necessary that the starting of the burner, i. e. the starting of the motor for pumping the fuel into the combustion furnace or the turning on of the supply of the fuel, or both, together with the turning on of the ignition means, shall be carried into effect through the medium of apparatus which provides a discontinuance of operation after a short time should the furnace thermostat not operate, or, in other words, should the flame in the combustion furnace not be established. The continuance of fuel supply therefore is dependent upon operation of the flame thermostat, due to flame establishment. If at a later time the flame should fail or go out then counter-operation of the flame thermostat will cause the supply of fuel to be stopped, and preferably cause the control apparatus to lock out, so as to prevent its further automatic operation without personal attention.

The system of automatic control of the present invention provides for a small power device, such as a heat operated device, to close and open two switches and also open only, one additional switch, in their proper sequence, in order to obtain this desired result.

In a preferred arrangement the power unit comprises a vessel of variable capacity and a vessel associated therewith adapted to be heated by an electric resistance, both vessels being filled with liquid, the increase in capacity of the vessel of variable capacity due to evaporation of some of the liquid in the associated vessel on being heated by the electric resistance serving to operate switches in a desired order. The electric resistance is connected through the water thermostat of a boiler, water heater or the like and/or the thermostat in the space to be heated and through the safety or flame thermostat in its cold position with the source of current, so that when the water thermostat or the thermostat in the space to be heated is calling for heat the associated vessel of the power unit is heated and a movable part of the vessel of variable capacity is moved to operate two starting switches which serve to switch on the ignition and the motor supplying the fuel or open a fuel supply cock.

The connections are such that on flame being established the flame thermostat in changing over to its hot or running contact interrupts the supply of current to the electrical resistance of the power unit causing the liquid to condense and the switches to be returned into initial position but retains the supply of current to the fuel supply motor through the hot contact of the flame thermostat. The switches are so arranged that they close the ignition and motor circuits before complete evaporation of the liquid in the associated vessel of the power unit.

Assuming the flame is lit and is accidentally extinguished the flame thermostat will break circuit from its hot contact thereby interrupting the circuit to the motor and stopping delivery of fuel to the furnace. On re-establishment of the circuit through the cold contact the electrical resistance will again supply heat to the power unit, whereupon after a definite time interval the moving member of the power unit will again move the ignition and motor switches into starting position. If, however, flame is not established the resistance will continue to evaporate the liquid in the power unit, the moving member of which will continue its stroke and in the continuation of its stroke will open a third switch interrupting the main supply of current to the whole of the fuel burning apparatus, necessitating a manual operation to reset the apparatus to allow it to restart.

Suitably this third switch is so arranged in relation to a casing containing the power unit as to be opened by a device which will maintain it in locked position until reset by hand.

An electro-magnetic relay may be used to start the fuel supply motor or open the fuel valve, its operating circuit being controlled by one of the switches closed by the control device. Established flame closes the running contact of the flame switch to retain this relay closed dependent upon the continued burning of the fuel.

Figure 2:
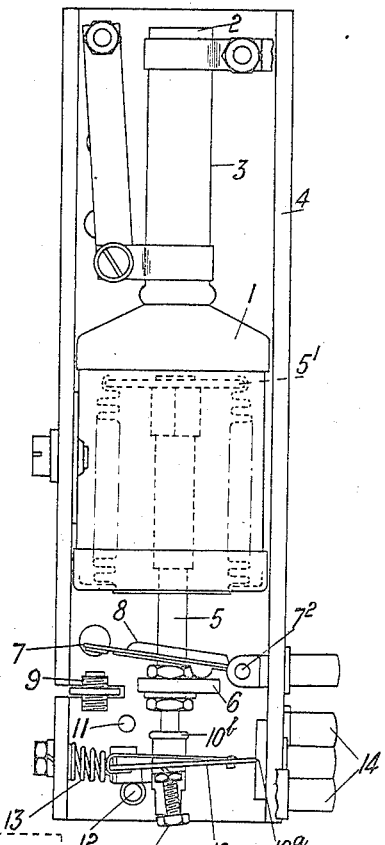
Figure 3:
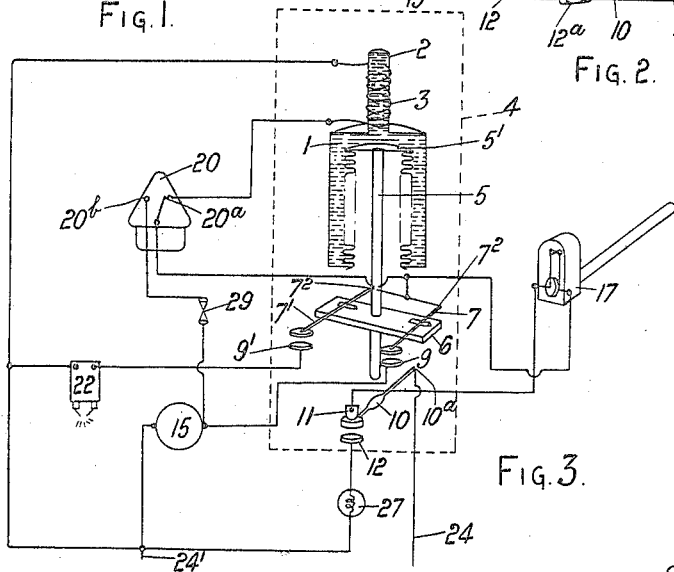

The invention is illustrated in the accompanying drawing in which Figs. 1 and 2 illustrate one form of the power unit and its associated switches, Fig. 1 showing the front wall of the casing broken away to illustrate a portion of the switch. Fig. 2 is a view of the power unit and its switches at right angles to Fig. 1, the side wall of the casing being assumed to be removed to expose the unit to view. In this figure the lock out switch above referred to as the third switch is shown in locked out position from which it must be reset by hand before the apparatus will operate. Fig. 3 is a circuit diagram illustrative of the operation of the device.

In the form of the controlling apparatus selected for illustration the power unit or switch actuator comprises a fluid-containing vessel 1 surmounted by an evaporating chamber 2 on which is wound an electrical resistance 3. This unit is shown in Figs. 1 and 2 as secured by means of brackets within a rectangular tube of insulating material 4 from which are also supported the various switches to be operated thereby. One wall of the vessel 1 includes a moving plate 5' which is connected by means of a bellows to a stationary part of the vessel. To the plate 5' there is fitted a rod 5 carrying an insulating cross bar 6 against which are pressed by means of springs 8, 8' two switch levers 7, 7' pivoted at 7² on brackets mounted in the casing 4. The switch levers 7, 7' will thus be raised against the action of the springs 8, 8' as the rod 5 moves inwards and will be pressed by the springs as the rod moves outwards into contact with fixed contacts 9, 9' secured to conducting terminals. A third switch 10 pivoting about a knife edge 10a and engageable by a collar 10b on the rod 5 is adapted to be held by a spring 13. This spring is in compression between the end of switch lever 10 and the casing 4, thus imparting to the switch lever 10 a snap over centre action, giving contact with either one of contacts 11 or 12, but lever 10 is unable to remain at any intermediate position. The switch 10 is moved by the collar 10b as the rod 5 moves outwards from contact 11 to contact 12 but remains in this position as the rod again moves inwards until returned by hand by pressure on the stud 12a. Terminals 14 permit connections to be made from the various switches to the fuel supply motor or valve, to the ignition means and to the controlling thermostats. These terminals may be plug connectors to facilitate connection to suitable sockets fixed on the connections to fuel supply means, thermostats, etc.

Consideration of this device in conjunction with circuit diagram Fig. 3 will make clear the sequence of operations. In the diagram 3 indicates the resistance unit which heats the liquid in the evaporating chamber 2 of Figs. 1 and 2, 7 and 7' denote the switches 7 and 7' of Figs. 1 and 2, 9, 9' the contacts corresponding to contacts 9, 9' of Figs. 1 and 2. 10 is the third or lock out switch corresponding to that indicated at 10 in Figs. 1 and 2. 15 represents the motor or fuel valve or other fuel supply means. 17 is an automatic temperature or pressure controlling switch which may be the switch of the water thermostat and/or of the thermostat in the space to be heated. 20 is the flame sensitive switch and 22 the ignition means in the form of a transformer. 27 is an alarm device adapted to operate to give a visible and/or audible signal when the plant has been locked out or shut down due to a failure. The supply mains are indicated at 24 and 24'.

Before starting the plant, the various switches will be in the position indicated in Fig. 3 and upon a demand for heat, switch 17 will close and current will flow from the main 24 through the switch 10, and the temperature or pressure controlling switch 17 to the flame sensitive switch 20. This switch will be on its "cold" contact 20a and therefore the circuit will be completed through the heater resistance 3 wound on the evaporating chamber 2 to main 24'. After a short time the liquid in chamber 2 will boil and the portion evaporated will displace some liquid into the chamber 1. As a result the rod 5 attached to the moving plate 5' of chamber 1 will be moved outwards allowing switches 7 and 7' to contact with their respective fixed contacts 9 and 9'. There will thus be established two parallel circuits in series with switch 17, one through switch 7' to the ignition device 22 and the second through switch 7 to the fuel supply device 15 and to the main 24'. Fuel will then be supplied to the furnace and flame should be established, causing the flame thermostat 20 to change over to its "hot" or running contact 20b. This action interrupts the circuit to the heater 3 wound on the chamber 2. Consequent cooling causes condensation of the vapour in the chamber 1 and the return of the rod 5 to its original position, opening as it moves inwards again switches 7 and 7'.

Referring to the diagram it will be seen that the opening of these two switches 7 and 7' cuts off the current from the ignition device 22, which will not be required to operate once flame is established, and the fuel supply means 15 is now energized through switches 17 and the flame sensitive switch 20. If on starting flame should not be established the switch 20 will remain in contact with its "cold" contact 20a allowing current to continue to flow through heater 3. This continued heating will evaporate more of the liquid in chamber 2 until the rod 5 by the continuation of its outward stroke and the pressure of the collar 10b thereon will cause the switch 10 to leave the contact 11 and make contact with the contact 12 thus opening switch 10 and stopping the plant and also energizing the alarm device 27. The resetting of the switch 10 by hand by pressing the stud 12a is then necessary before a restart can be made.

As indicated in Fig. 3 a fuse 29 is provided in the circuit between the flame thermostat 20 and the fuel supply motor 15, which fuse is of such capacity as will carry safely the running current of the fuel supply motor but will blow out if, due to the flame thermostat adhering on its "hot" contact 20b in spite of extinction of the flame, the starting current of the motor should be passed through it.

I claim:—

1. In a fuel burner control system of the class described, in combination, fuel feeding means, a thermal control switch, a combustion responsive switching device having hot and cold contacts, the former being closed in response to the establishment of combustion and the latter being closed in the absence of combustion, a normally open switch and a normally closed switch, which is so constructed as to require a manual reclosing after being opened, an electrically heated expansible device operable when heated to a predetermined degree to close said normally open switch and upon further heating to open said normally closed switch, a first circuit including the normally closed switch, the control switch, the cold contact of the combustion responsive switching device, and the electric heater for the expansible device, a second circuit having therein the normally closed switch, the control switch, said normally open switch and the fuel feeding means, and a third circuit including said normally closed switch, said control switch, the hot contact of the combustion responsive switching device, and the fuel feeding means.

2. In a fuel burner control system of the class described, in combination, fuel feeding means, ignition means, a thermal control switch, a combustion responsive switching device having hot and cold contacts, the former being closed in response to the establishment of combustion and the latter being closed in the absence of combustion, two normally open switches and a normally closed switch, which normally closed switch is so constructed as to require a manual reclosing after being opened, an electrically heated expansible device operable when heated to a predetermined degree to close said normally open switches and upon further heating to open said normally closed switch, a first circuit including the normally closed switch, the control switch, the cold contact of the combustion responsive switching device, and the electric heater for the expansible device, a second circuit having therein the normally closed switch, the control switch, one of said normally open switches and ignition means, a third circuit having therein the normally closed switch, the control switch, the other of said normally open switches and the fuel feeding means, and a fourth circuit including said normally closed switch, said control switch, the hot contact of the combustion responsive switching device, and the fuel feeding means.

LEONARD SATCHWELL.